(12) United States Patent
Hernandez et al.

(10) Patent No.: US 8,437,875 B2
(45) Date of Patent: May 7, 2013

(54) OUTDOOR HOME CLEANING ROBOT

(76) Inventors: Eusebio Guillermo Hernandez, South Miami, FL (US); Michael Christopher Colucci, Ewing, NJ (US)

( * ) Notice: Subject to any disclaimer, the term of this patent is extended or adjusted under 35 U.S.C. 154(b) by 1227 days.

(21) Appl. No.: 12/289,350

(22) Filed: Oct. 27, 2008

(65) Prior Publication Data

US 2010/0106298 A1 Apr. 29, 2010

(51) Int. Cl.
*G06F 19/00* (2011.01)
(52) U.S. Cl.
USPC ............... 700/245; 15/319; 15/320; 15/321; 134/18; 134/56 R; 134/172; 134/184; 134/198; 700/23
(58) Field of Classification Search ............ 15/53.1, 15/319, 320, 321; 118/305, 323; 134/172, 134/184, 198, 56 R, 18; 244/134 C; 340/988, 340/990, 995.1; 700/17, 23, 245, 248
See application file for complete search history.

(56) References Cited

U.S. PATENT DOCUMENTS

| | | | | |
|---|---|---|---|---|
| 4,698,775 A | * | 10/1987 | Koch et al. | 700/218 |
| 5,180,122 A | * | 1/1993 | Christian et al. | 244/134 F |
| 5,490,646 A | * | 2/1996 | Shaw et al. | 244/134 C |
| 5,959,423 A | * | 9/1999 | Nakanishi et al. | 318/568.12 |
| 2003/0156493 A1 | * | 8/2003 | Bayer | 367/6 |
| 2005/0126144 A1 | * | 6/2005 | Koselka et al. | 56/10.2 R |
| 2005/0196543 A1 | * | 9/2005 | Morton | 427/421.1 |
| 2006/0184272 A1 | * | 8/2006 | Okazaki et al. | 700/245 |
| 2008/0001005 A1 | * | 1/2008 | Weaver et al. | 239/225.1 |

* cited by examiner

*Primary Examiner* — Khoi Tran
*Assistant Examiner* — Stephen Holwerda
(74) *Attorney, Agent, or Firm* — Stanley H. Kremen (57) ABSTRACT

An autonomous all weather outdoor cleaning robot that identifies and cleans various outdoor household objects including but not limited to personal automobiles and other vehicles. The robot autonomously navigates to a designated area and scans a vehicle or object to determine the optimum cleaning routine. The robot learns its working environment by comparing scanned vehicles and outdoor objects with its existing database for future reference. The robot compares and stores navigation data regarding areas previously visited to increase efficiency for future work by reducing travel and scanning times. The robot can perform many different functions. Specifically, the robot incorporates micro-processors to control cleaning, navigation and perception. The robot uses multi-segmented arms to perform chores. The robot adapts and learns from its environment while performing useful tasks.

11 Claims, 10 Drawing Sheets

OUTDOOR HOME CLEANING ROBOT

FIELD OF THE INVENTION

The existing invention is an autonomous all weather, outdoor home cleaning robot with multi-function capabilities. Specifically, the present invention uses microprocessors and sensors to navigate to an area of operation to perform specific cleaning tasks. More specifically, after navigating to the general area of operation the present invention performs a scan of the object to be cleaned to determine the best and most efficient cleaning method for its multi-segmented arm(s) in order to perform purposive details. Even more specifically, the present invention will focus on cleaning personal vehicles, including but not limited to automobiles, small utility vehicles, pickup trucks or most ride on vehicles in the average home.

BACKGROUND OF THE INVENTION

Robots have been performing useful chores in our society and for industry for many decades. More recently, home robots for cleaning, for children and entertainment have been becoming more affordable to the average consumer. Small cleaning robots for inside the home have been around for over a decade and are more affordable now than ever before. These small robots usually perform some cleaning and vacuuming for rugs and floors and are usually limited to the immediate area or rooms with little interaction with the robots surroundings. Many military and some scientific robots exist that may be semi or fully autonomous and can learn or navigate through their environment whether outdoors, indoors, in the air, space or underwater. These robots are extremely costly and would be exceedingly rare or affordable to the general public even more so for the average home owner. In addition, military robots use costly and complex user interfaces.

There exists a need in our society to keep personal motor vehicles clean. Cleaning personal home vehicles requires time, effort, inconvenience, and considerable expense when using commercially available sources. Currently, a vehicle can be washed by hand, or in a local car wash. Today, the only commercial cleaning systems are large mechanical types installed either outside or within large structures, or as part of free-standing or do-it-yourself car washes. These machines are too expensive, cumbersome and unrealistic to own and operate for home use. Utilizing commercially available car washes may be inconvenient because of the time, vehicle wear, and fuel used driving to and from the washing facility. In addition there may exist exposure to haphazard details such as personal belongings missing, accidents occurring on the way to the facility and unforeseen damage to the vehicle. As a consequence of these factors, specifically keeping a personal home vehicle clean on a routine basis has been impractical for the average motorist or home owner. Therefor a void exists within the realm of cleaning personal vehicles. Since the advent of robotics and affordable microprocessors and computer technology, it is now possible to design and build a robotic vehicle washing system, which is simple, compact and economical enough for private residential use. There is a need for an outdoor personal vehicle cleaning robot that makes time-consuming and tedious car washing less of an issue. Enter the current invention.

SUMMARY OF THE INVENTION

The current invention is associated with an autonomous outdoor-indoor, all weather, terrain versatile, cleaning, utility & maintenance robot with the capacity of learning, updating and storage of environmental data materials that can utilize various application packages with task specific mountable hardware and consumable materials.

The current invention utilizes integrated circuit controlled home vehicle cleaning robots with the apparatus to adapt and learn from its environment and perform purposeful chores.

The present invention comprises a multi-tiered platform framework a terrain versatile wheeled base housed beneath said multi-tiered platform which moves the multi-tiered platform over a relatively horizontal foundation, an upper section above said multi-tiered platform with independently moving segmented mechanical arms for various cleaning implements, a control section housed within said multi-tiered platform using wireless and wired, digital and analog processing for robotic navigating, obstacle avoidance, transmitting and receiving data for the purpose of cleaning and maintaining objects. It uses 2 and 3 dimensional environmental learning matrices to control robotic navigation maneuvers. Said environmental data matrices generate a path of efficiency which conserves power and time. Said path of efficiency minimizes sensor errors by use of sensor redundancies and by maximizing obstacle avoidance through the use of ultrasonic, infrared (IR), optical, camera imaging, geo-synchronous positioned satellite (GPS) devices, wheel encoders and mechanical actuators.

BRIEF DESCRIPTION OF THE DRAWINGS

The present invention is believed to be distinctive with the attributes it contains. The following description along with the provided drawings will reference a preferred embodiment in which.

DESCRIPTION OF THE PREFERRED EMBODIMENTS

In the present invention, an autonomous robot is primarily constructed to effectively clean the exterior of home personal motor vehicles. Additionally, an autonomous robot is constructed to effectively clean the exterior of any personal motor vehicles. Additionally, the autonomous robot utilizes a control section FIG. 2 (10) to navigate to and from its work area and analyze the motor vehicle or other object to be cleaned upon reaching its work area. The control section is housed within said multi-tiered platform FIG. 2 (10) using wireless and wired, digital and analog processing for robotic navigating (33), obstacle avoidance, sending and receiving data and cleaning and maintaining objects through the use of 2D and 3D environmental learning matrices (henceforth 2D environmental matrices refers to a probabilistic representation of x-y coordinates (i.e. surface of the earth orthogonal to gravitational pull wherein x-y coordinates do not correspond to any vertical motion and 3D environmental matrices refers to x-y-z coordinates (i.e. 2D matrices with integration of vertical coordinates wherein vertical coordinates correspond to the z direction), wherein said robotic navigation maneuvers said robot within said environmental data matrices, and generates a path of efficiency which conserves power and time. Said path of efficiency minimizes sensor errors by use of sensor redundancies by maximizing obstacle avoidance through the use of ultrasonic (19) (53), infrared (IR) (17) (21) (41) (50), optical camera imaging (20)(51), geo-synchronous positioned satellite (GPS) devices (37), wheel encoders (55) and mechanical actuators (52). Within the control section of the present invention, a tilt control sensor (23) will monitor pitch of the surrounding area and any unsafe weight shift initiating an auto shut down.

Figure 1:
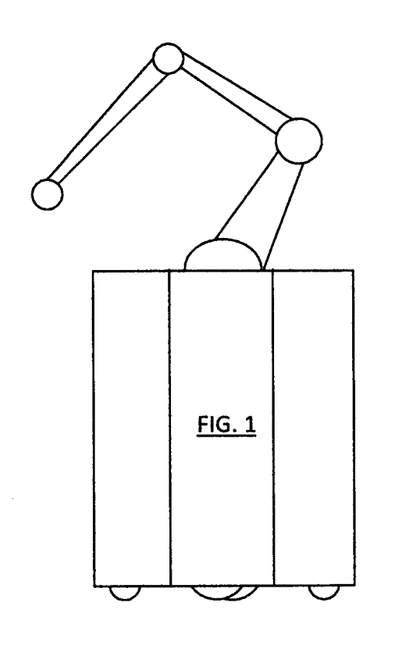
FIG. 1 is a side view of one embodiment of the robot of the present invention.

Within the art, there are many shapes and sizes of mobile robots. Detailed embodiments of the present invention are herewith described however, a preferred embodiment of the present invention is an octagonal design containing clear aspects as shown in FIG. 1

In a first embodiment, the present invention will be configured to clean the exterior of personal home motor vehicles, such as automobiles, small utility vehicles, pickup trucks and motor cycle type vehicles.

Figure 5:
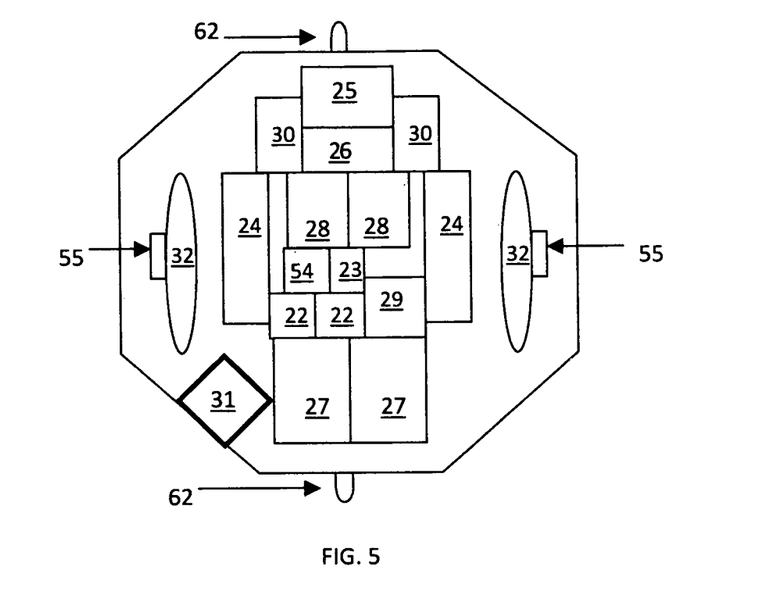
FIG. 5 is a plan view of one embodiment of the drive section of the present invention with the operational, control and containment section removed.
Figure 6:
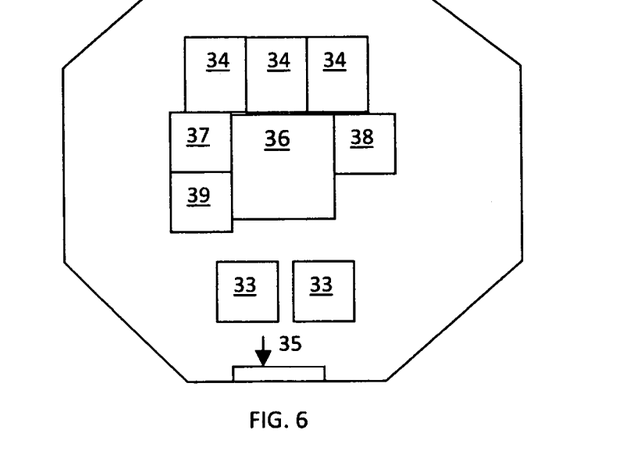
FIG. 6 is a plan view of one embodiment of the control section of the present invention with the operational section removed.
Figure 9:
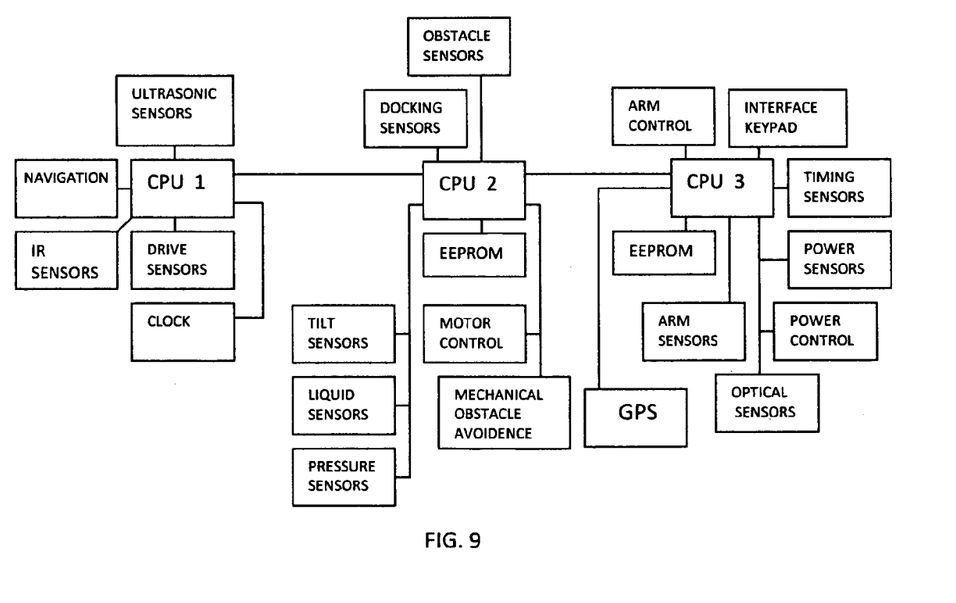
FIG. 9 shows an operative block diagram of the control system located within the control section.
Figure 10:
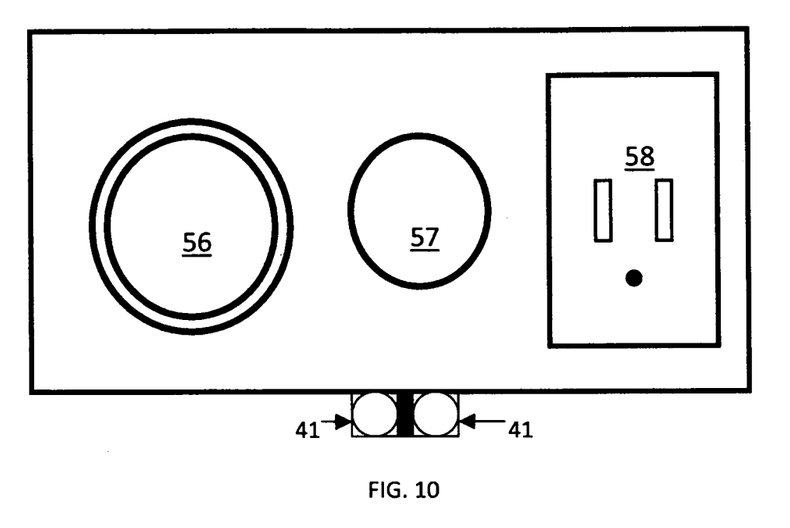
FIG. 10 is a face on diagram of one of the preferred embodiments of the wall docking station adapter.
Figure 10A:
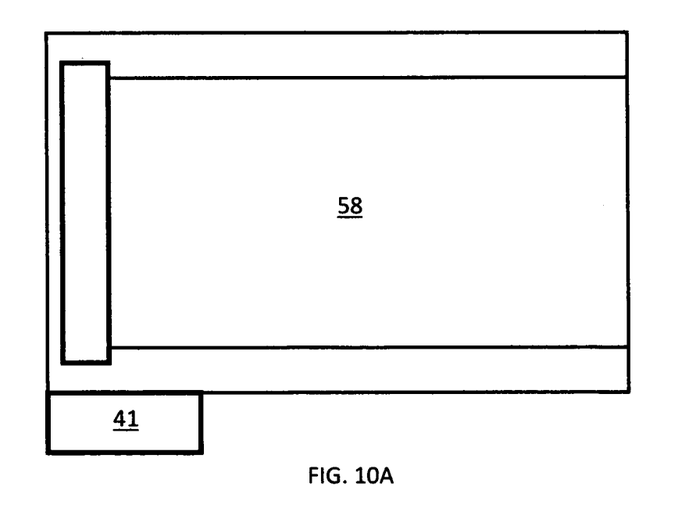
FIG. 10A is a side transparent view of one embodiment of the wall docking station adapter.
Figure 10B:
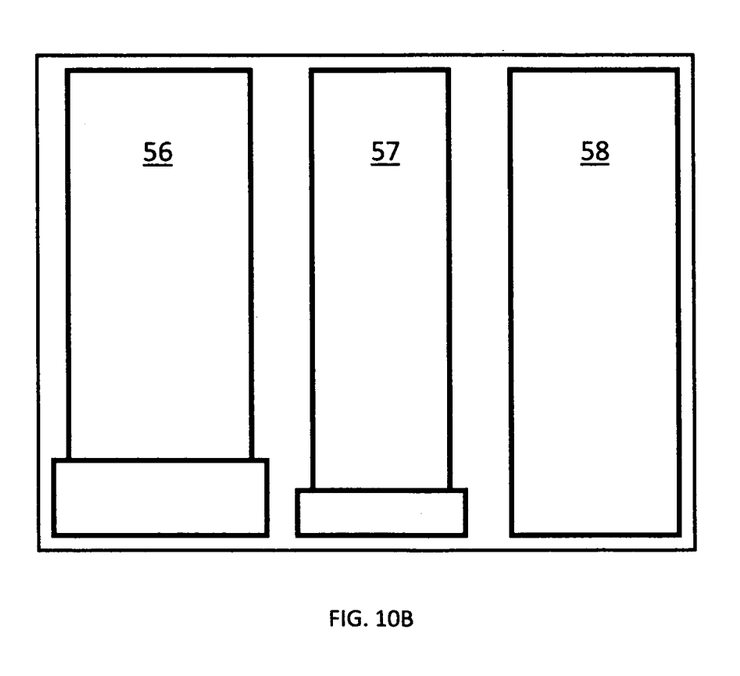
FIG. 10B is a plan transparent view of the wall docking station adapter.

In a preferred embodiment, the present invention will comprise a multi-tiered platform framework, with a drive section FIG. 5 which moves the robot along a path of efficiency along a generally horizontal surface. It includes a control section which transmits, receives and stores data within said multi-tiered platform through the use of multiple microprocessors FIG. 6 (34) FIG. 9.

In another embodiment, the present invention can be configured to clean the exterior of boats, outdoor furniture or an easily definable object such as a small shed or outdoor grill, even a small deck. The present invention uses a database that can retrieve pre-loaded matrices of common objects. It can clean immediately, or clean using different programmable schedules, tailored for whatever is to be kept clean. It autonomously completes whatever duty cycle is required and then navigates back to its docking station, where it re-fills its fluids, replenishes solvents and recharges its batteries without human intervention. With this system, the current invention will clean the vehicle when needed. Henceforth, duty cycle refers to the time when the robot wakes, leaves its docking station, navigates to its work area, initiates a scan, starts and completes its cleaning routine, navigates back to its docking station, replenishes power and materials then sleeps.

In another embodiment, the present invention can easily be programmed to clean most military land vehicles such as hummers, trucks or armored vehicles.

Figure 2:
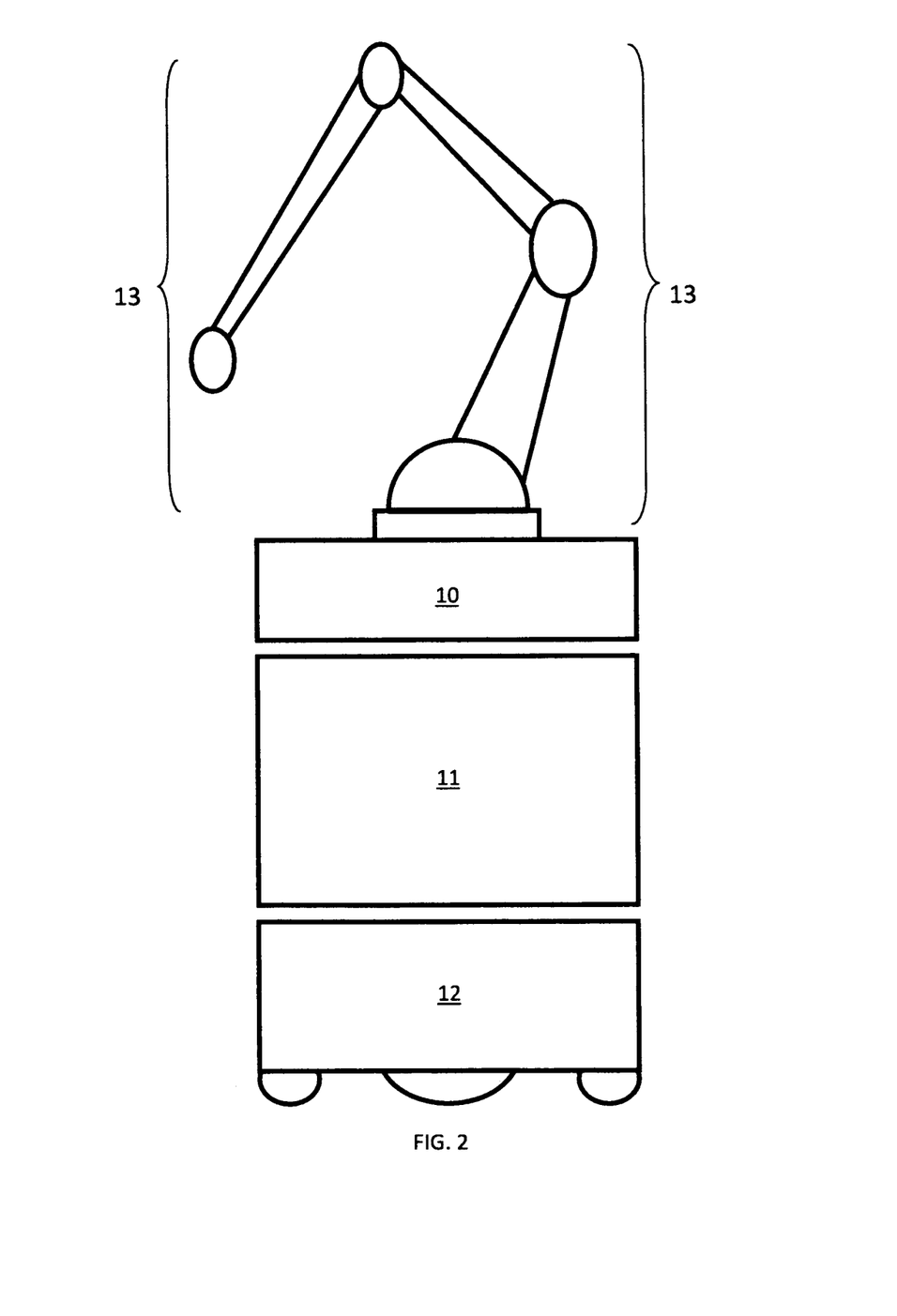
FIG. 2 is a side layered section view of the multi-tiered platform.
Figure 11:
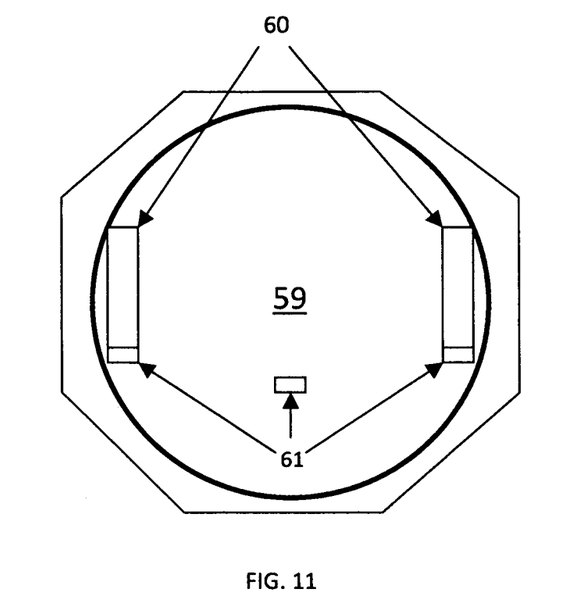
FIG. 11 plan view of a preferred embodiment of the containment section
Figure 11A:
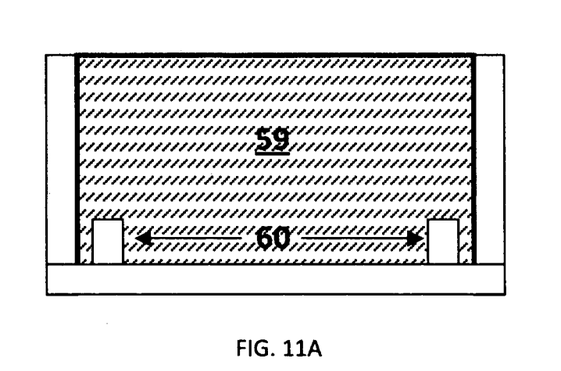
FIG. 11A is a transparent side view of the containment section

The present invention utilizes a containment section FIG. 2 (11) and FIG. 11 (11A) housed within said multi-tiered platform associated with cleaning, utility and maintenance used to control distribution, pressure, temperature and flow rate of various stored liquids and solvents. The containment section consists of at least 2 liquid enclosures ranging in storage capacity from 6 oz. to 150 gal. The present invention utilizes a 50 gallon water storage tank (59), contained within said multi-tiered platform, which provides water for approximately 30 minutes of continuous water spray at a rate of 1.6 gal/min, one or more solvent/detergent reservoirs (22) (60) and or drying agent may be included within said containment section. One enclosure holds water and the other(s) will hold soap or solvents. All water or liquid containers will be monitored with liquid (61), pressure (54) and or temperature sensors, which signal the control section when liquid levels are critically low or the proper temperature is achieved. The current invention uses an electric pressure washer pump assembly (26) to allow a 600-2800 PSI spray to develop through the high pressure hoses. The current invention may also be fitted with an air compressor system (25) to blow material off of surfaces in a vehicle, building or any definable object. The present invention maintains a power section housed within said multi-tiered platform FIG. 2 (12) used to power said segmented mechanical arm(s) FIG. 3, wheels (32), control section and containment section (FIG. 2 (11)). The power section is co-located with the driving section, within the present invention it utilizes 2-6 deep-cycling gel batteries (27) which provide enough power to complete at least one duty cycle before re-charging. These batteries will power items such a drive motors, water pumps or other high powered motors. Additionally, there will be at least 6-24 other re-chargeable batteries (28) (29) (30), such as lead-acid, Ni-Cad or ion batteries to power components such as arm(s), stepper motors, sensors, displays (35), microprocessors, communication devices (38) and other low power items. The power section uses sensors (39) to monitor battery levels and current flow entering and exiting all electrical devices.

The drive section is governed by said control section housed within said multi-tiered platform using power from the power section to maneuver said robot through horizontal and vertical directional means. The present invention utilizes two independent DC powered motors (24) with magnetic gear locking mechanisms that engage in the event of sudden power loss or obstacle detection or avoidance. All-terrain non-pneumatic rubber tires are fitted to each wheel axle (32) in addition to heavy-duty all-terrain casters (62) with sealed bearings mounted on the front and rear of the drive section chassis. The present invention maintains a low horizontal operational speed of generally under 2 fps. This allows the current invention to move more precisely and avoid any potential hazards.

Figure 7:
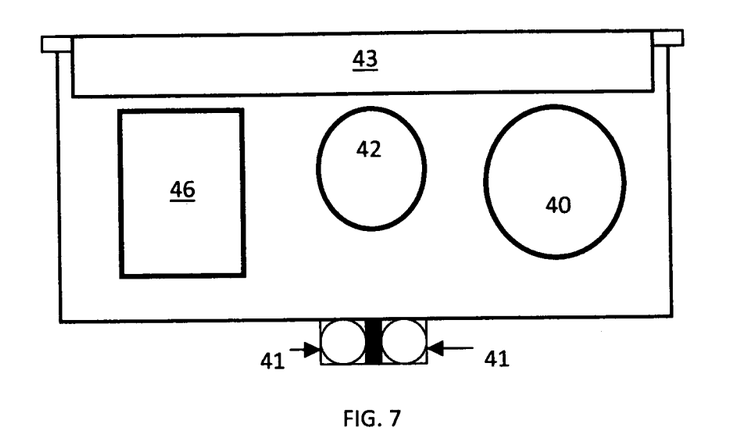
FIG. 7 is one embodiment of the internal docking mechanism of the present invention.
Figure 7A:
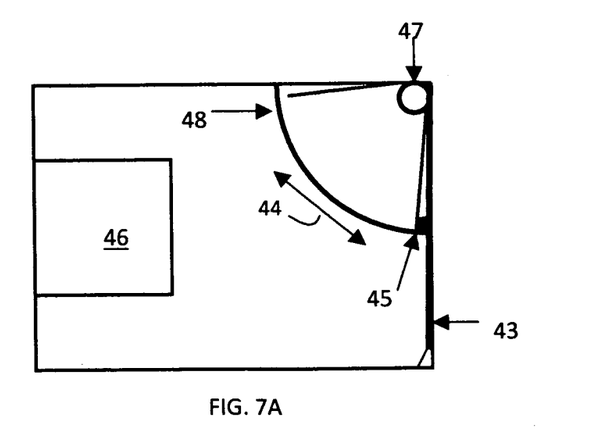
FIG. 7a is a transparent side view of one embodiment of the docking mechanism of the present invention.
Figure 8:
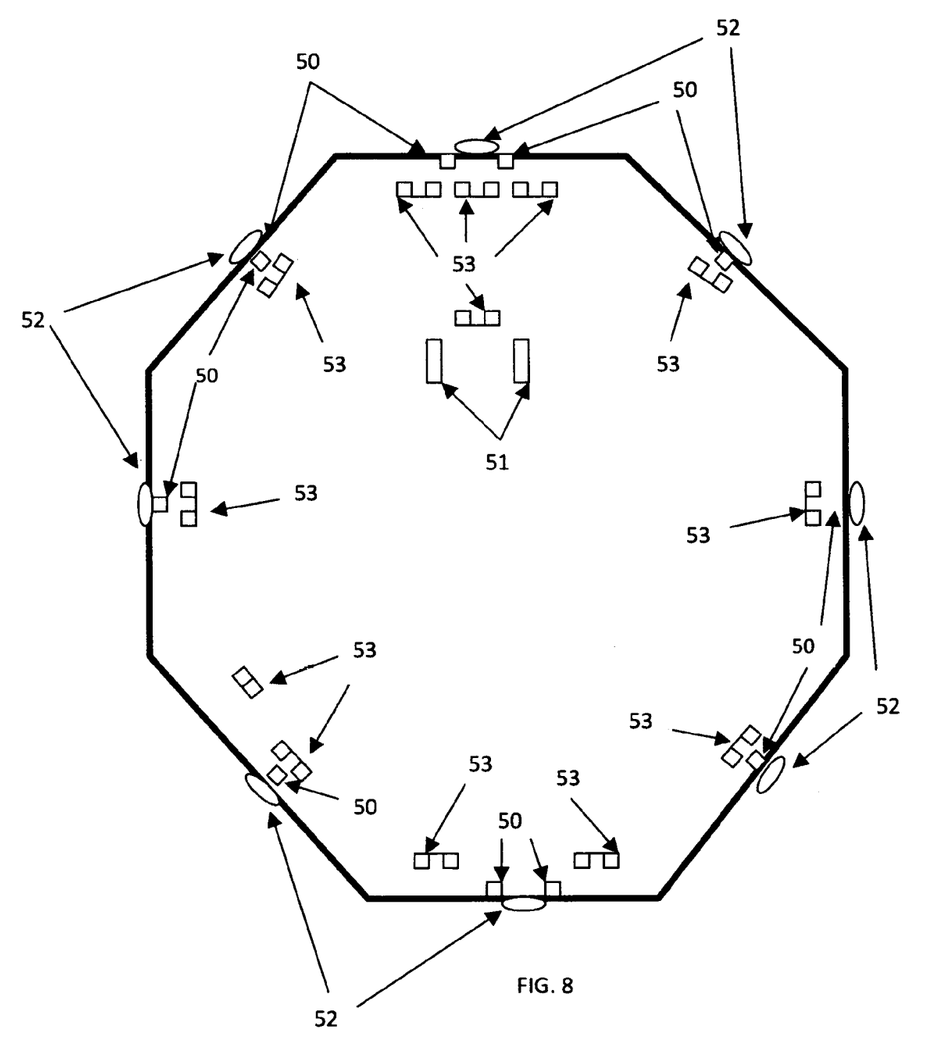
FIG. 8 is a transparent plan view depicting one embodiment of the present invention with multiple sensors around and within the multi-tiered platform.

The docking section FIG. 7 (7A) housed within said multi-tiered platform is used to replenish power from said power section (46) and replenish liquid (40) and solvents (42) from said containment section it allows battery recharging and fluid replacement through the use of a coupler assembly (31) shielded by a tension activated waterproof cover (43) which moves in a generally up and down movement (44), directed by a guide pin (45) that moves along a guide track (48) regulated by a tension spring device (47), internal integrated circuits provide regulation of electrical flow. The external docking section for the current invention can be mounted on most walls and will use standard 120V outlets for recharging. Water can be replenished through standard water outlets. The docking section coupling device within the present invention will presently maintain at least an electrical (58), water (56) and solvent (57) adapter, with a similar opposing adapter on the external wall docking section.

Figure 3:
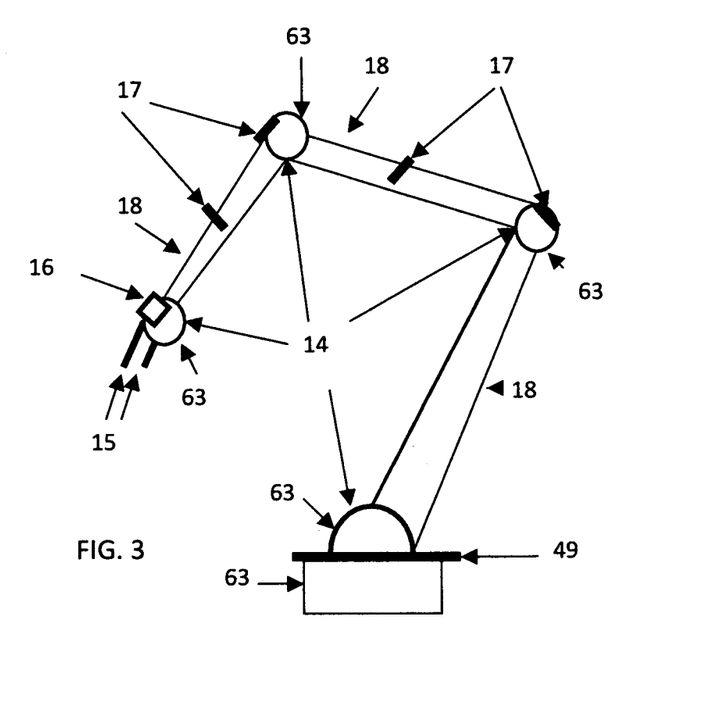
FIG. 3 is a view of one embodiment of an independently moving multi-segmented mechanical arm of the present invention.
Figure 4:
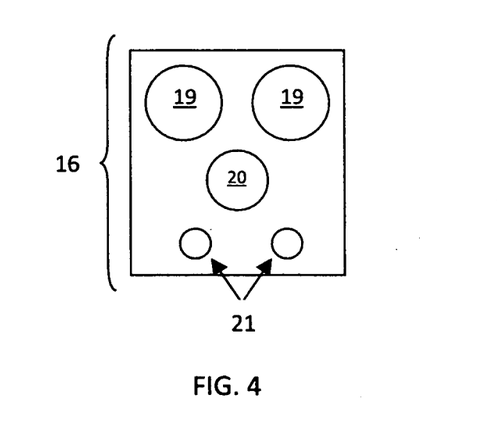
FIG. 4 is a front view blow up of one embodiment of an arm sensor housing FIG. 3 (16).

The operational section FIG. 2 (13) located directly above said multi-tiered platform designed to carry out instructions transmitted from said control system through the use of independently moving multi-segmented mechanical arms. The multi-segmented mechanical arms arm(s) of the present invention will use at least 5 stepper motors (63), located within each cylindrical motor housing (14) for accurate movement and for the use of at least one high pressure spraying system (15) to remove debris. The first segment of the independently moving segmented mechanical arm(s) FIG. 3 are mounted on a metallic plate (49), whose base (36) is connected to a stepper motor, thus allowing it to rotate 360' about the horizontal plane. Another motor connects the upper portion of the turntable to the bottom of the principal base housing. This moves first segment up to 180' about the vertical plane. The second segment (18) is connected to the end of the first segment within a cylindrical motor housing (14), allowing this segment to also move up to 270' about the vertical plane. The third segment (18) is connected to the end of the second segment with another cylindrical motor housing (14), which allows this segment to also move up to 270' about the vertical plane. The fourth segment (18) is connected to the end of the third segment with another motor, which allows this segment to move up to 270' about the vertical plane. This fourth segment also accommodates various cleaning attachments, including but not limited to one or more spray nozzles, brushes, proximity sensors, ultrasonic sensors, optical sensors and or infrared sensors. The independently moving segmented mechanical arm(s) also contain all necessary equipment for the stepper motors, sensors, and hoses leading up to the cleaning apparatus within the arm(s). The multi-segmented mechanical arms also move at a moderate to slow pace in order to provide maximum torque and high efficiency cleaning.

What is claimed is:

1. An autonomous robot for cleaning and maintaining a variety of objects that are located either indoors or outdoors, said robot including components that further comprise:
   a) an independently moving plurality of segmented mechanical arms further comprising a plurality of spray nozzles that provide soap, water, or solvents to a targeted cleaning area;
   b) an all weather exterior housing above which the plurality of segmented arms are mounted, wherein said housing is resistant to heat, cold, humidity, electromagnetic disturbances, dust and corrosion;
   c) a plurality of wheels or tracks that rotate, thereby permitting the robot to move within a prescribed area;
   d) a containment section that contains the soap, water, or solvents, wherein said containment section is located within the exterior housing;
   e) a plurality of sensing devices;
   f) electronics and computer processors and memory located within the exterior housing, wherein:
      i) said electronics further comprise:
         a power section that provides electricity to all components that require electricity, wherein said power section comprises AC and DC sources of electricity;
         a control section that uses wireless, digital, and analog processing for robotic navigation, obstacle avoidance, sending and receiving data, and cleaning and maintaining objects;
         a docking section that mates with an external docking station, wherein said docking station replenishes said DC sources of energy when they are depleted electrically; and
      ii) said computer processors and memory further comprise:
         an object database in memory and object database management system, wherein said object database comprises data regarding various objects to be cleaned or maintained, such that the robot can recognize the objects the data for which is contained within said database;
         a navigational database in memory and navigational database management system, wherein said navigational database comprises data regarding the prescribed area where the various objects to be cleaned or maintained are located;
         a processing module programmed to cause the plurality of sensing devices to scan the prescribed area automatically and to store data from said scan in memory;
         a processing module programmed to process data retrieved from memory that was obtained from the plurality of sensing devices and to compare that sensing data with data from the object database management system, such that the robot is configured to automatically recognize and identify the variety of objects to be cleaned or maintained;
         a processing module programmed to clean or maintain each of the variety of objects selected by user input, according to a pre-loaded series of steps, and once said user input is received, to clean or maintain said variety of objects without further human intervention;
         a processing module programmed to locate each of the variety of selected objects within the prescribed space;
         a processing module programmed to navigate the robot to said at least one of the variety of selected objects without further human intervention;
         a processing module programmed to avoid obstacles during navigation of the robot;
         a processing module programmed to store in memory in the navigational database, data for the prescribed area, and to compare scan data obtained from the plurality of sensing devices with the previously stored navigation data regarding the prescribed area for future work by reducing travel and scanning times;
         a processing module programmed to autonomously manipulate the plurality of segmented arms;
         a processing module to regulate the temperature and pressure of the soap, water, or solvents in the containment module;
         a processing module to control the spray nozzles during cleaning or maintenance of the variety of objects; and
         a processing module to control the cleaning or maintenance processing steps for each of the variety of objects to be cleaned or maintained;
   whereby the robot receives specifications from the user regarding what objects to clean or maintain, and without further human input, recognizes and locates the user specified objects, navigates to each of the user specified objects, cleans or maintains all of the user specified objects, and returns to the external docking station to be recharged when finished.

2. The robot of claim 1 wherein the plurality of sensing devices are each selected from the group consisting of digital cameras, electronic optical image sensors, electronic infrared sensors, electronic ultrasonic sensors, global positioning devices that use signals from geosynchronous orbital satellites, wheel encoders, and mechanical actuators.

3. The robot of claim 1 further comprising:
   a) a first microprocessor operationally connected to:
      i) a navigation firmware or software module;
      ii) a clock; and
      iii) one or more sensors, each selected from the group consisting of electronic ultrasonic sensors, electronic infrared sensors, and electronic drive sensors;
   b) a second microprocessor operationally connected to:
      i) an EPROM device;
      ii) a motor control module;
      iii) a mechanical obstacle avoidance module;
      iv) one or more sensors, each selected from the group consisting of obstacle sensors, docking sensors, tilt sensors, liquid sensors, and pressure sensors; and
   c) a third microprocessor operationally connected to:
      i) an EPROM device;
      ii) a keypad;
      iii) a segmented arm control module;
      iv) a power control module;
      v) a receiver and processor of data from global positioning devices that use signals from geosynchronous orbital satellites;
      vi) one or more sensors, each selected from the group consisting of timing sensors, power sensors, arm sensors, and optical sensors;
wherein the first microprocessor, the second microprocessor, and the third microprocessor are all operationally interconnected to each other.

4. The robot of claim 1 wherein each of the independently moving plurality of segmented mechanical arms comprises:
   a) an arm assembly further comprising plurality of arm segments connected to each other by cylindrical motor housings and to a metal plate mount by a cylindrical motor housing;
   b) an arm sensor housing which further comprises one or more sensors selected from the group consisting of electronic infrared sensors, electronic ultrasonic sensors, and optical digital cameras;
   c) a high pressure spraying system;
   d) a stepper motor; and
   e) a base upon which the arm assembly and the metal plate mount are attached.

5. The robot of claim 1 further comprising a drive section that comprises:
   a) at least one solvent or detergent reservoir;
   b) a tilt control sensor;
   c) at least one DC powered motor;
   d) an air compressor;
   e) an electric pressure washer pump assembly;
   f) at least one battery;
   g) a plurality of wheels and wheel encoders; and
   h) a plurality of wheel casters.

6. The robot of claim 1 further comprising a control section, atop which the arm assembly is mounted, wherein said control section comprises:
   a) a global positioning device that uses data received from geosynchronous satellites to determine location of the robot;
   b) a navigation module that processes data from the navigational data base management system;
   c) at least one communication device;
   d) at least one power sensor; and
   e) a stepper motor.

7. The robot of claim 1 wherein said obstacle avoidance utilizes a plurality of sensors that create a superimposed environmental matrix that detects and verifies obstacles using sensor redundancy, and wherein said obstacle avoidance can start and end motion to preserve a path of efficiency and safely maneuver the robot to a destination.

8. The robot of claim 7 wherein the plurality of sensors are situated within the arm assembly.

9. The robot of claim 7 wherein the prescribed area is mapped and stored in memory.

10. The robot of claim 5, wherein said power section is driven by dual deep cycling gel batteries to provide said drive section with enough charge to complete one duty cycle before recharging, wherein a duty cycle is a complete cleaning or maintaining task and said power section also utilizes a plurality of lead acid, nickel cadmium, or ion batteries to power microprocessors, sensors, display, and various other low power operations.

11. The robot of claim 5, wherein said docking station contains infrared sensors which guide and align the robot onto the external docking station, allowing for recharging and replenishing soap, water, and solvents.

* * * * *